(12) United States Patent
Böhnke et al.

(10) Patent No.: US 7,684,756 B2
(45) Date of Patent: Mar. 23, 2010

(54) ADAPTIVE SUBCARRIER LOADING

(75) Inventors: Ralf Böhnke, Esslingen (DE); Seiichi Izumi, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 953 days.

(21) Appl. No.: 09/988,937

(22) Filed: Nov. 19, 2001

(65) Prior Publication Data

US 2002/0102940 A1 Aug. 1, 2002

(30) Foreign Application Priority Data

Nov. 20, 2000 (EP) .................................. 00125435

(51) Int. Cl.
*H04B 7/00* (2006.01)
(52) U.S. Cl. ...................... 455/45; 455/39; 455/42; 455/91; 455/95; 455/102; 455/112; 375/295; 375/298; 375/300; 375/302
(58) Field of Classification Search .................. 455/504, 455/506, 67.11, 65, 67.13, 23, 42, 63.1, 39, 455/45, 91, 95, 102, 112; 370/208; 375/295, 375/298, 300, 302
See application file for complete search history.

(56) References Cited

U.S. PATENT DOCUMENTS 5,726,978 A 3/1998 Frodigh et al.

6,701,129 B1* 3/2004 Hashem et al. .......... 455/67.11
6,882,618 B1* 4/2005 Sakoda et al. ............... 370/208
2001/0031626 A1* 10/2001 Lindskog et al. ........... 455/67.3

FOREIGN PATENT DOCUMENTS

WO WO 97/44925 11/1997
WO WO 99/30465 6/2000

OTHER PUBLICATIONS

Keller, T.; Hanzo, L.; Vehicular Technology, IEEE Transactions on, vol. 49, Issue: 5, Sep. 2000 pp. 1893-1906.*
J Keller, T.; Hanzo, L.ioDvehicular Technology, IEEE Transactions on, vol. 49, Issue: 5, Sep. 2000 pp. 1893-1906.*

(Continued)

*Primary Examiner*—Raymond S Dean
(74) *Attorney, Agent, or Firm*—Oblon, Spivak, McClelland, Maier & Neustadt, L.L.P.

(57) ABSTRACT

A wireless multicarrier transmission method wherein subcarriers of the transmission are adaptively modulated. The fading condition of each subcarrier is detected to generate fading channel profile information. Adaptive loading tables are calculated for lower, standard, and higher modulation schemes. One of the adaptive loading tables is selected and those subcarriers having low fading channel profile information are modulated with the lower modulation scheme, subcarriers having medium fading channel profile information are modulated with the standard modulation scheme, and subcarriers having high fading channel profile information are modulated with the higher modulation scheme.

11 Claims, 11 Drawing Sheets

OTHER PUBLICATIONS

T. Keller et al: "Adaptive Multicarrier Modulation: A Convenient Framework for Time-Frequency Processing in Wireless Communications" Proc. IEEE (USA), Proceedings of the IEE, vol. 88, No. 5, May 2000, pp. 611-640, XP002171294.

Hamaguchi K et al: "Performance of Multicarrier/QAM-Level-Controlled Adaptive Modulation for Land Mobile Communication Systems" IEICE Transactions on Communications, JP, Institute of Electronics Information and Comm. Eng. Tokyo, vol. E81-B, No. 4, Apr. 1, 1998, pp. 770-775, XP000780472.

M. Giacomo: "Analysis and Comparison of Different Modulation Methods for Wireless Broadband Indoor Link" CEFRIEL, Online, Jun. 2000, pp. 1-15, XP002171295.

R. Grünheid et al: "Adaptive Modulation for the Hiperlan/2 Air Interface" 5th International OFDM Workshop 2000, Online, Sep. 2000, pp. 4-1-4-4, XP002171296.

Krongold et al, "Computationally Efficient Optimal Power Allocation Algorithms for Multicarrier Communication Systems," IEEE Transactions on Communications, vol. 48, No. 1, 2000, pp. 23-27.

\* cited by examiner

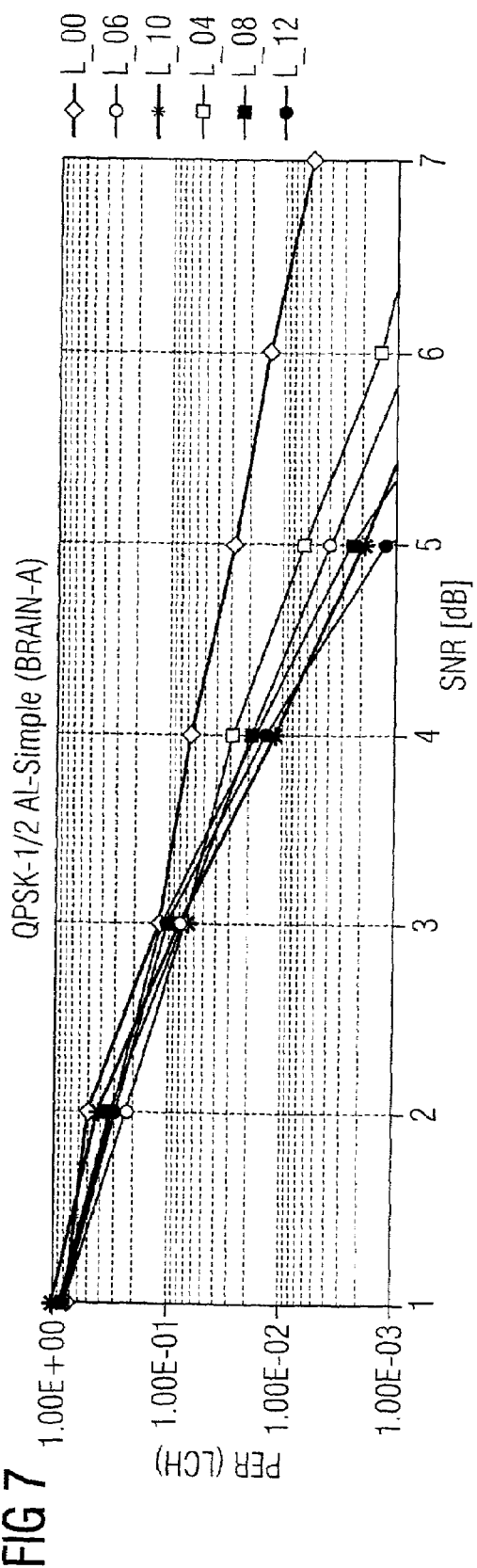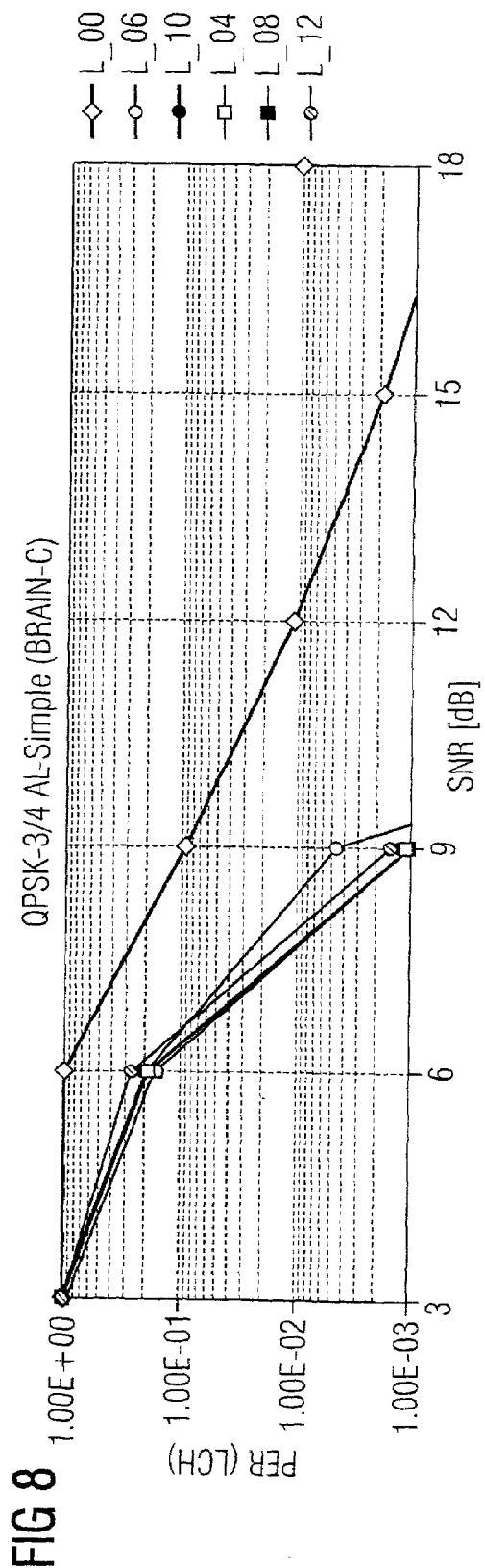
FIG 7
FIG 8

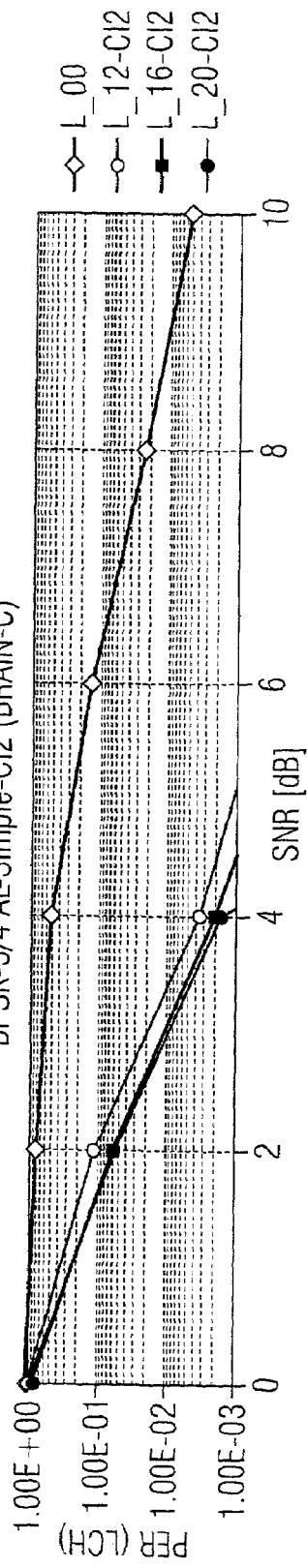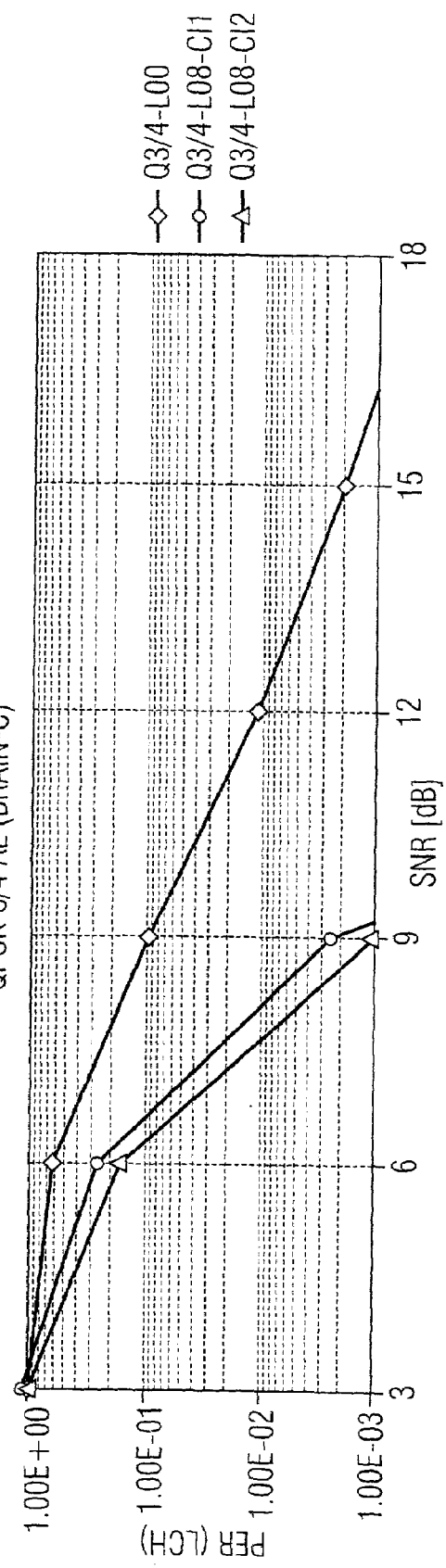

ADAPTIVE SUBCARRIER LOADING

The present invention relates to a wireless multicarrier transmission method, wherein subcarriers of the multicarrier transmission are modulated, to a computer software program product implementing such a method when run on a computing device of a wireless transmitting device, to a data train for wireless multicarrier transmission having subcarriers which are adaptively modulated as well as to a wireless multicarrier transmission device.

In certain transmission systems (e.g. band-constrained wired channels, e.g. telephone line or wireless channels=multi-path, frequency selective channels) the channel quality (loss) is frequency selective. The goal of adaptive modulation in multi-carrier systems such as f.e. OFDM is to assign an optimum modulation scheme (e.g. by changing the constellation set) for each of the sub-carriers such that the maximum performance can be achieved. This will increase the throughput (very good frequency bands are exploited by large constellation sets=modulation alphabets, bad frequency bands are not used for data transmission) and at the same time decrease the error-rate (as more robust constellation sets are used on bad transmission bands). A drawback of adaptive modulation schemes is that both sides of the transmission system (transmitter and receiver) need to know the specific modulation scheme (loading) used on each carrier. This can either be fixed (if the channel is known and constant), negotiated during connection set-up (if the channel is constant for the entire duration of the transmission connection), or made adaptive (scheme is modified, re-negotiated during the connection each tine the transmission channel is changed).

The application of adaptive subcarrier loading on wireless transmission systems has the problem that typically the channel conditions change rapidly due to mobility of the users and therefore new loading tables (used modulation scheme for each subcarrier) would have to be exchanged between the transmitter and the receiver. Using out-dated channel information for the loading would result in degraded transmission quality.

To allocate the best modulation scheme to each used subcarrier different algorithms have been examined, see e.g. 'Computationally Efficient Optimal Power Allocation Algorithms for Multicarrier Communication Systems' (Brian S. Krongold, Kannan Ramchandran, Douglas L. Jones, IEEE TRANSACTIONS ON COMMUNICATIONS, VOL. 48, NO. 1, 2000.

From WO 99/30465 a bit allocation technique in a transmission system is known. This technique comprises associating a quality factor to each subcarrier, computing a loading constant as the quotient of a difference and the number of carriers that have no bits allocated.

U.S. Pat. No. 5,726,978 discloses a technique for an adaptive channel allocation in a frequency division multiplexed system. A subset of carriers is chosen from a larger set of subcarriers available for communication on a link. As communication takes place on the link, signal quality measurements on the subcarriers of the subset of subcarriers and interference measurements on the subcarriers of the group of subcarriers are periodically performed. The measurements are then used to reconfigure the subset of subcarriers to reduce co-channel interference on the link.

WO 97/44925 discloses a technique for dynamic load balancing using handoff to mitigate the adverse effect of the load imbalance phenomenon prevalent in spread spectrum, multicarrier wireless communication systems. The multicarrier wireless communication system monitors a plurality of matrix corresponding to the loading of each of the plurality of carriers in the communication system and, based upon the matrix, handoffs call traffic to and between the plurality of carriers thereby mitigating the adverse effect associated with the load imbalance.

The invention will be explained later on in an application scenario of the Hiperlan/2 standard. Therefore in the following background information on this standard will be given. However it is important that the concept of the invention is not only applicable for the explained ETSI BRAN Hiperlan/2 standard but also for all other multicarrier systems.

Forward Error Correction and Modulation

In Hiperlan/2 a multi-rate PHY layer is adopted, where the "appropriate" mode will be selected by a link adaptation scheme, which is not specified in the standard. In table 1, the mode dependent parameters are described.

TABLE 1

Parameters of physical modes

| Modulation | Coding rate R | Nominal bit rate [Mbit/s] | Coded bits per sub-carrier $N_{BPSC}$ | Coded bits per OFDM symbol $N_{CBPS}$ | Data bits per OFDM symbol $N_{DBPS}$ |
|---|---|---|---|---|---|
| BPSK | 1/2 | 6 | 1 | 48 | 24 |
| BPSK | 3/4 | 9 | 1 | 48 | 36 |
| QPSK | 1/2 | 12 | 2 | 96 | 48 |
| QPSK | 3/4 | 18 | 2 | 96 | 72 |
| 16 QAM | 9/16 | 27 | 4 | 192 | 108 |
| 16 QAM | 3/4 | 36 | 4 | 192 | 144 |
| 64 QAM | 3/4 | 54 | 6 | 288 | 216 |

Each particular mode is defined by the combination of a certain FEC encoding scheme and a certain modulation type. The modulation types BPSK, QPSK, 16 QAM as mandatory types and 64 QAM as an option are available. A convolutional encoder is used for FEC encoding. By puncturing the encoded bit stream, different coding rates and therefore different levels of error correction capabilities can be achieved. In table 1, each row describes a particular physical mode. The physical mode described in the first row uses BPSK modulation and a code rate of 1/2. This mode achieves the lowest bit rate of 6 Mbit/s but provides the best robustness in terms of error correction capability. The optional physical mode in the last row achieves the highest data rate of 54 Mbit/s but needs very good link quality.

In FIG. 1, the consecutive functional blocks for FEC encoding and modulation following the scrambling processing 16 of the receiving part 10 are shown. The function FEC and modulation on the transmitter side 10 consists of six functional blocks: tail bit appending 1, convolutional encoding 2, puncturing P1 3, puncturing P2 4, interleaving 5 and bit to symbol mapping 6. The appended tail bits are needed for code termination. The convolutional encoder 2 is a rate 1/2 encoder with 64 states. The puncturing P1 3 is applied to obtain exactly a code rate of 1/2. For this purpose, only twice the number of tails bits has to be punctured out, independently of the desired code rate of the physical mode. The puncturing P2 4 is used to obtain the desired code rate 15 of the physical mode and, therefore, the desired code rate is needed as input. After puncturing 3, 4, the interleaving is performed by a block interleaver 5 with a block size corresponding to the number of bits in a single OFDM symbol. The interleaver 5 ensures that adjacent coded bits are mapped onto nonadjacent subcarriers and that adjacent coded bits are mapped alternately onto less and more significant bits of the constellation points of the modulation alphabet. Consequently the interleaved bits are mapped 6 onto the signal constellation points of the modulation alphabet. The output of the FEC & Modulation block 7 are the subcarrier symbols supplied to the OFDM symbol generator 26.

The demodulation & error correction block 14 on the receiving side containing a symbol-to-bit-demapping unit 12, a de-interleaver 20, a de-puncturing P2 unit 21 and a de-puncturing P1 unit 22 connected to the error correction 23, tail bit removing unit 24 and descrambling unit 25 (see FIG. 1) of the receiving side 11 will not be further explained here.

Interleaving in Hiperlan/2

All encoded data bits are block interleaved 5, the block size corresponding to the number of bits in a single OFDM symbol, $N_{CBPS}$. By k the index of the coded bit before the first permutation is denoted; i shall be the index after the first and before the second permutation and j shall be the index after the second permutation, just prior to modulation mapping 6.

The first permutation, is defined by the rule:

$$i=(N_{CBPS}/16)+(k \bmod 16)+\text{floor}(k/16), k=0, 1, \ldots, N_{CBPS}-1$$

The function floor(.) denotes the largest integer not exceeding the parameter, and mod is the integer modulo operator.

The second permutation is defined by the rule:

$$j=s\times\text{floor}(i/s)+(i+N_{CBPS}-\text{floor}(16\times i/N_{CBPS})) \bmod s, i=0,1,\ldots N_{CBPS}-1$$

The value of s is determined by the number of coded bits per sub-carrier, $N_{BPSC}$, according to:

$$s=\max(N_{BPSC}/2,1)$$

Examples: $N_{CBPS}$=48 (BPSK), 96 (QPSK), 192 (16QAM), 288 (64QAM).

$N_{BPSC}$=1 (BPSK), 2 (QPSK), 4 (16QAM), 6 (64QAM).

PDU (Protocol Data Unit) TYPES

FIG. 2 shows the structure of the different PDUs that define the message format of the respective transport channels. There are five different PDU formats:
  BCH-PDU format;
  FCH-PDU format;
  Long (L)-PDU format;
  downlink Short (S)-PDU format;
  uplink Short (S)-PDU format.

In FIG. 2 on the left side of each PDU format, the respective transport channels, that use this format are shown. The BCH, FCH and LCH use dedicated formats. Both the ACH and the SCH in the downlink use the downlink S-PDU format, and also both the RCH and the SCH in the uplink use the uplink S-PDU format. The content of the message fields in the different PDU formats, depends on the logical channel, that is mapped on the respective transport channel. Only the length of the message field is in the scope of the PDU format specification. For enabling the receiver to distinguish between different logical channels using the same format, the L-PDU and the two S-PDUs give indication of the message type in a type field at the beginning of the PDU. Moreover, depending on the PDU format, the last 16 or 24 bits are reserved for the redundancy produced by a cyclic redundancy check (CRC) code. This redundancy can be exploited at the receiver for error detection. All PDU formats are of fixed length, except the FCH-PDU. The FCH-PDU consists of a certain number of information element blocks. In FIG. 2, only one information element block is shown but the actual FCH-PDU may be composed of a multiple of these blocks. Each information element block consists of three particular information elements (IE) and a field with redundancy for error detection. The particular information element itself contains a flag, a type field and a message field.

Depending on the PDU format (type, modulation scheme, code rate) a different number of OFDM symbols is required for transmission:

TABLE 2

Different PDU length/coding schemes used in the H/2 reference simulations

| | PDU length [byte], Transport channel(s) | | | |
|---|---|---|---|---|
| Modulation and Coding Rate | 9 Byte ACH, SCH, RCH | 15 Byte BCH | 27 Byte FCH | 54 Byte LCH |
| BPSK, ½ | 3 [OFDM Symbl.] | 5 [OFDM Symbl.] | 9 [OFDM Symbl.] | 18 [OFDM Symbl.] |
| BPSK, ¾ | 2 [OFDM Symbl.] | | | 12 [OFDM Symbl.] |
| QPSK, ½ | | | | 9 [OFDM Symbl.] |
| QPSK, ¾ | 1 [OFDM Symbl.] | | | 6 [OFDM Symbl.] |
| 16QAM, 9/16 | | | | 4 [OFDM Symbl.] |
| 16QAM, ¾ | | | | 3 [OFDM Symbl.] |
| 64QAM, ¾ | | | | 2 [OFDM Symbl.] |

Link Adaptation

As shown in FIG. 3, according to the Hiperlan/2 standard a multi-rate PHY layer is adopted, where the "appropriate" mode will be selected by a link adaptation scheme. The link adaptation 17 selects a suitable combination of modulation scheme 18 (e.g. BPSK, QPSK, 16QAM) and coding scheme 19 (e.g. convolutional code with coderate 1/2 or 3/4). In the current systems therefore the same modulation scheme is used for all subcarriers (e.g. 48 data subcarriers in Hiperlan/2), independent of the channel transmission profile. The individual subcarrier transmission quality (w.r.t. the channel profile) represented by the fading channel profile information 9 is therefore not reflected when assigning a constant, non-adaptive modulation scheme for all subcarriers.

In view of the above-cited prior art and the problems encountered therewith it is the object of the present invention to provide for an adaptive subcarrier loading technique in wireless multicarrier (e.g. OFDM) transmission system systems which can be implemented without larger changes of existing hardware and standards.

This object is achieved by means of the features of the independent claims. The dependent claims develop further the central idea of the present invention.

According to a first aspect of the present invention a wireless multicarrier transmission method is proposed, wherein subcarriers of the multicarrier transmission are modulated. The modulation scheme on each subcarrier is selected depending on the channel transfer function on the subcarrier.

For the selection of the modulation schemes loading tables can be calculated for the subcarriers. The loading tables have respectively one entry for each subcarrier.

The modulation scheme of subcarriers having a high power level can be increased, whereas the modulation scheme of subcarriers having a pore power level can be decreased respectively departing from of default a modulation scheme.

The modulation schemes of the subcarriers can be adapted such that the total number of coded bits per (OFDM) symbol is constant.

Along with adaptation of the modulation schemes the transmission power of the subcarriers can be adapted such that the total transmission power of all subcarriers remain unchanged along with the adaptation.

The modulation schemes of the subcarriers can be adapted such that the total number of coded bits per symbol is constant.

The transmission power of subcarriers having a higher modulation scheme can be enhanced to compensate for subcarriers which are not modulated at all (due to the adaptation of the modulation scheme).

An adaptive loading information reflecting the adaptation of the modulation scheme of the subcarriers can be exchanged between a transmitter and the receiver.

The step of exchanging the adaptive loading information between the transmitter and a receiver can comprise the steps of calculating a suitable loading based on received signals, sending the adaptive loading information in a signaling field and using the calculated adaptive loading in the data field of a transmitted data train.

A plurality of subcarriers can be bundled into groups and the same modulation scheme can be applied for all subcarriers belonging to the same group.

Particularly a plurality of adjacent subcarriers can be bundled into one group.

According to a further aspect of the present invention a computer software program product is proposed which can implement a method as set forth above when run on a computing device of a wireless transmitting device.

According to a still further aspect of the present invention a data train for a wireless multicarrier transmission having subcarriers which are adaptively modulated is proposed. The data train comprises at least one traffic data field as well as at least one adaptive modulation information field reflecting the modulation scheme of the subcarriers used for the traffic data field.

A plurality of subcarriers having the same modulation scheme can be bundled into a group and the adaptive modulation information field can contain information regarding the modulation scheme respectively used for one group of subcarriers.

According to a still further aspect of the present invention a wireless multicarrier transmission device is proposed comprising a modulator for modulating subcarriers of the multicarrier transmission. Furthermore, the wireless multicarrier transmission device comprises and adaptive loading calculation unit selecting the modulation scheme on each subcarrier depending on supplied channel transfer function information on the subcarrier.

Further object and featured of the invention will become evident for the man skilled in the art when reading the following description of embodiments taken in conjunction with the figures of the enclosed drawings.

Figure 1:
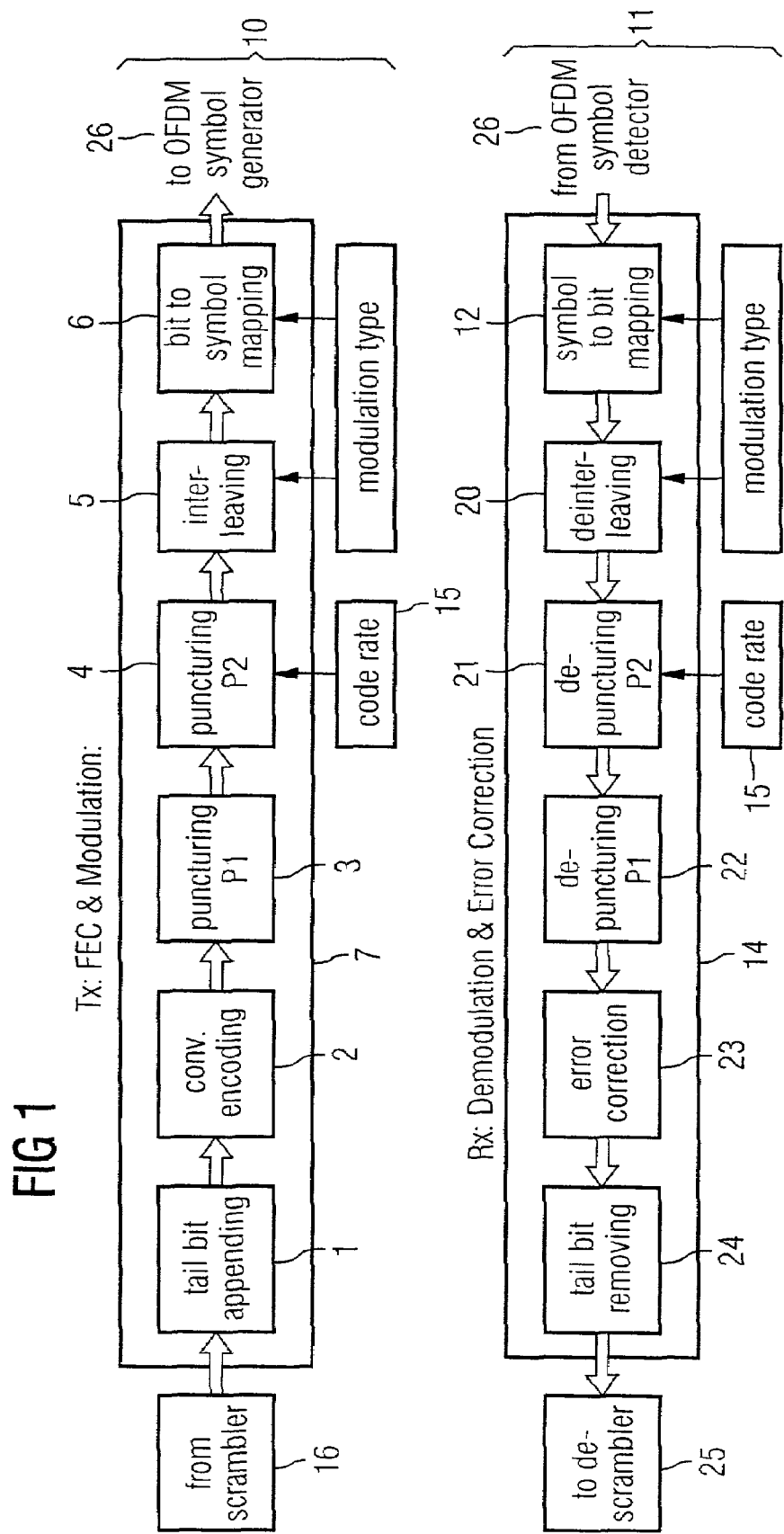
FIG. 1 shows a TX and a RX block according to the prior art.
Figure 2:
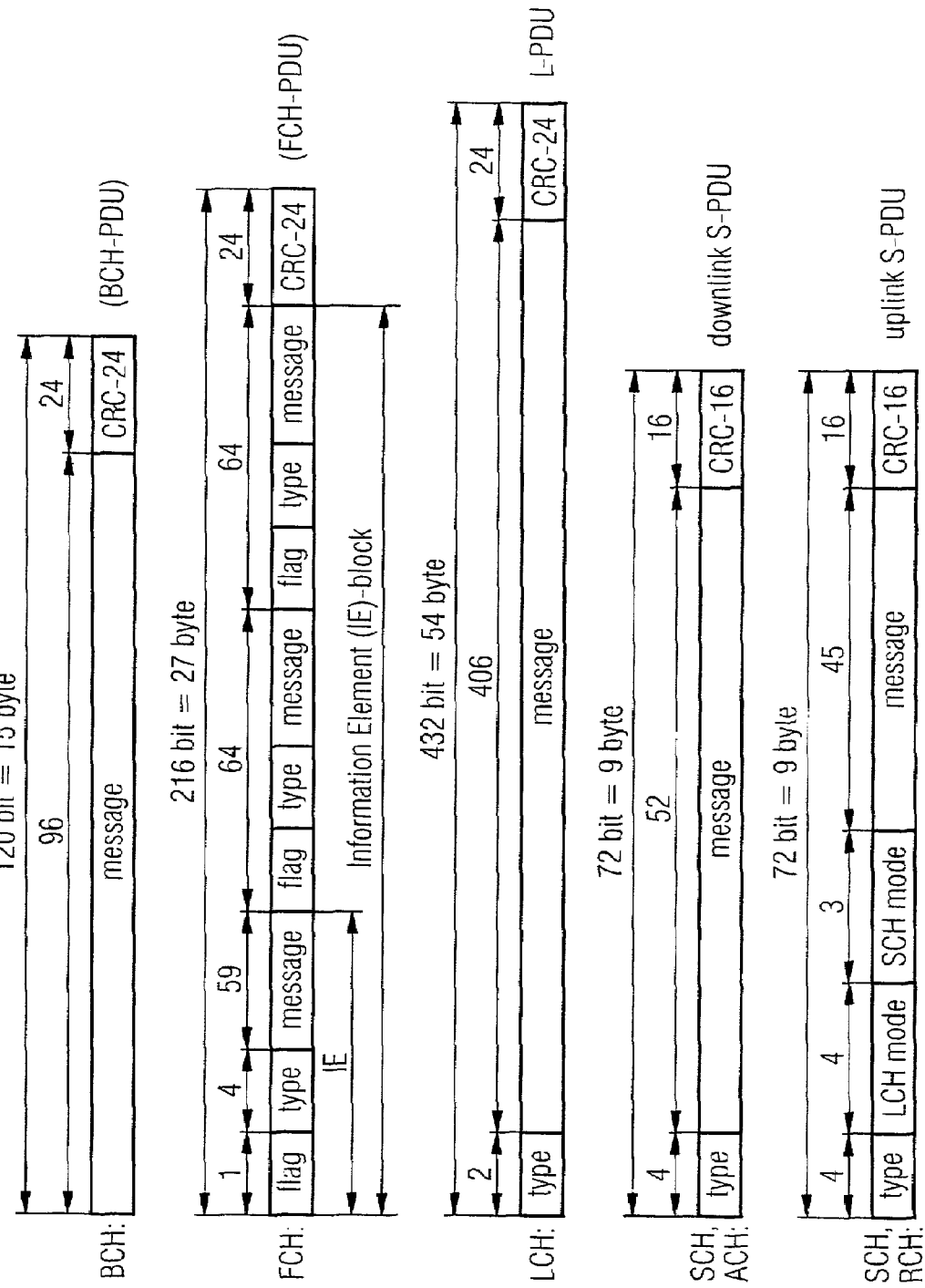
FIG. 2 shows the structure of PDU formats.
Figure 3:
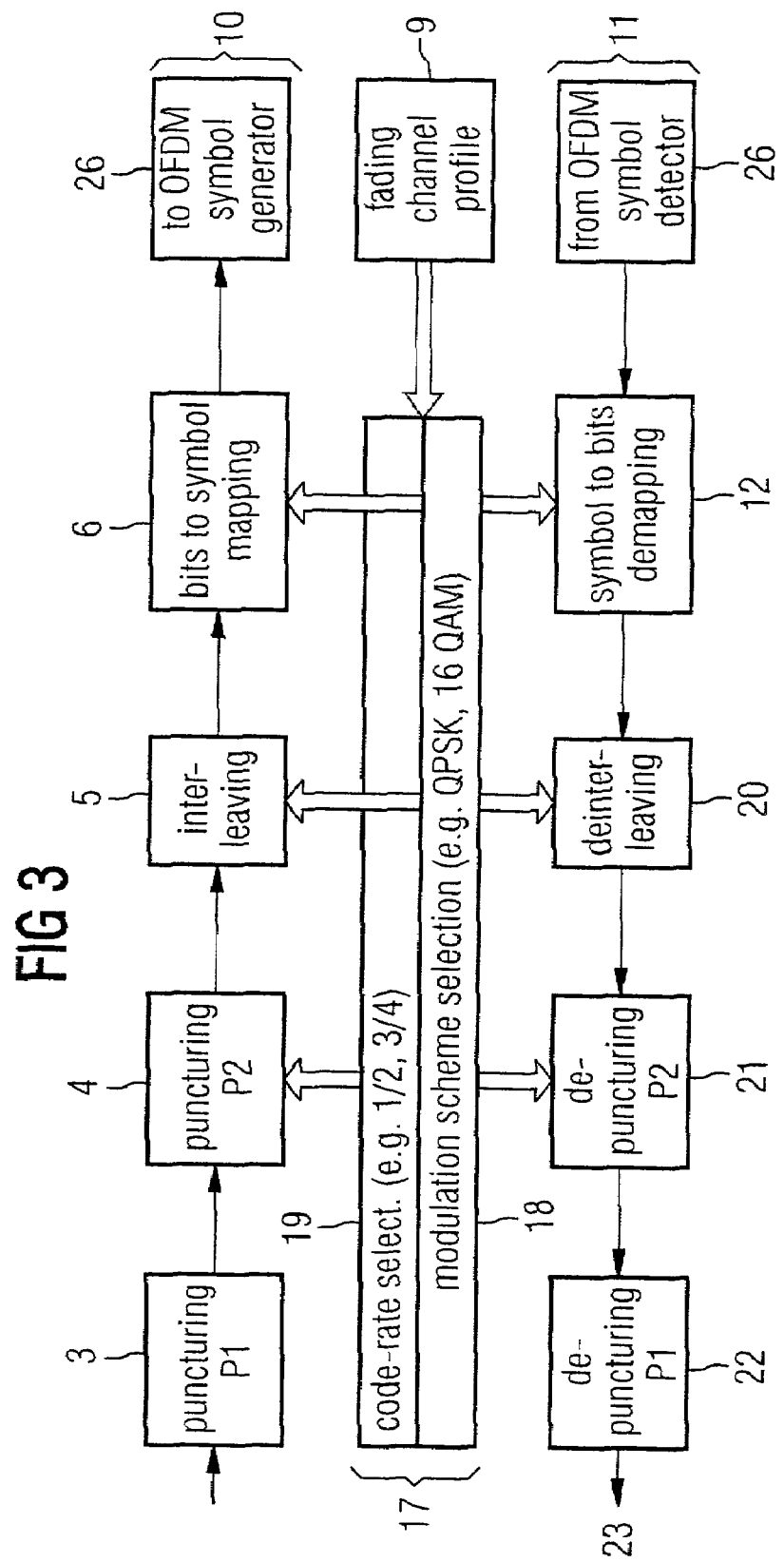
FIG. 3 shows the standard Hiperln/2 operation.
Figure 4:
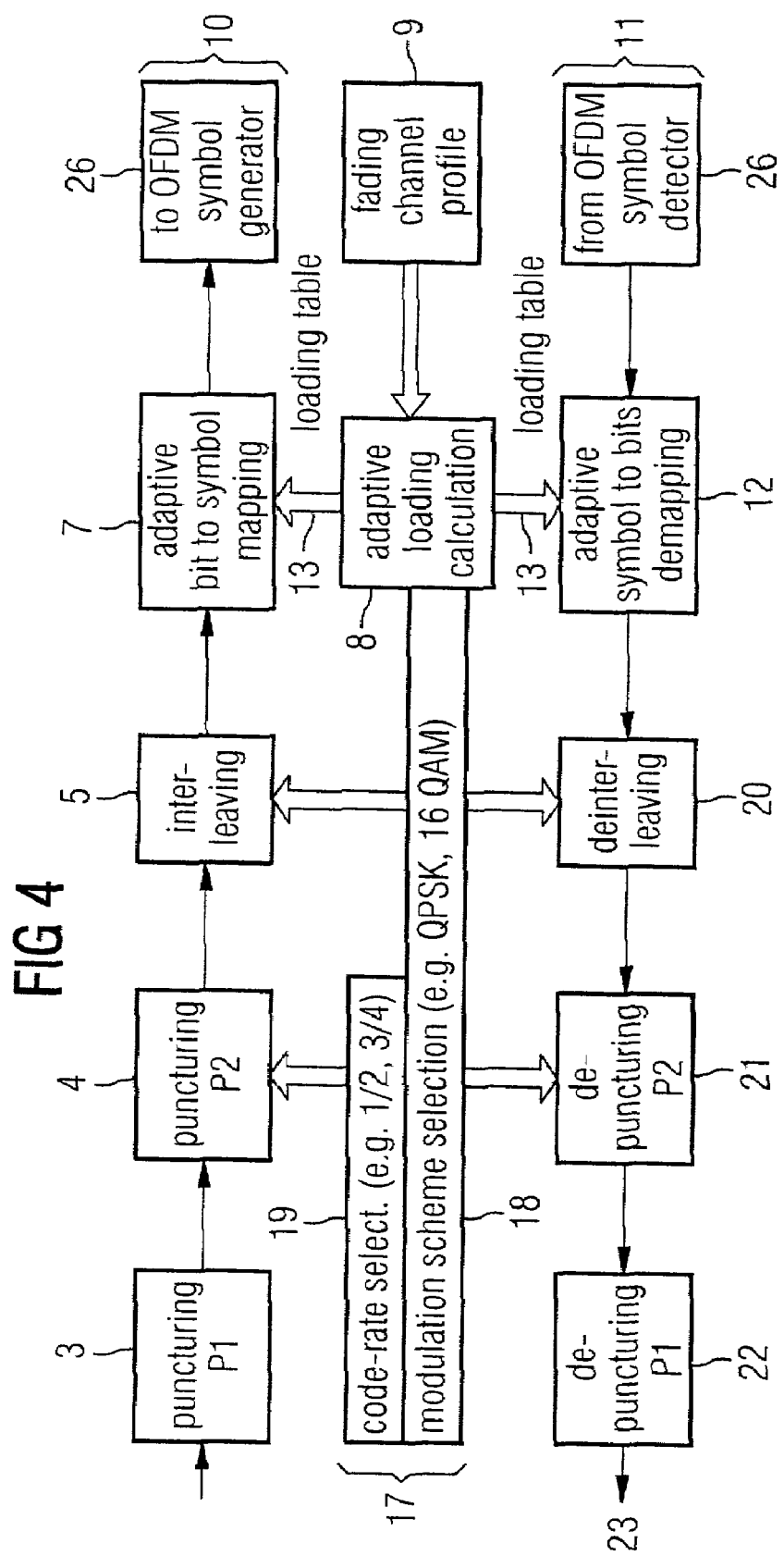
Figure 9:
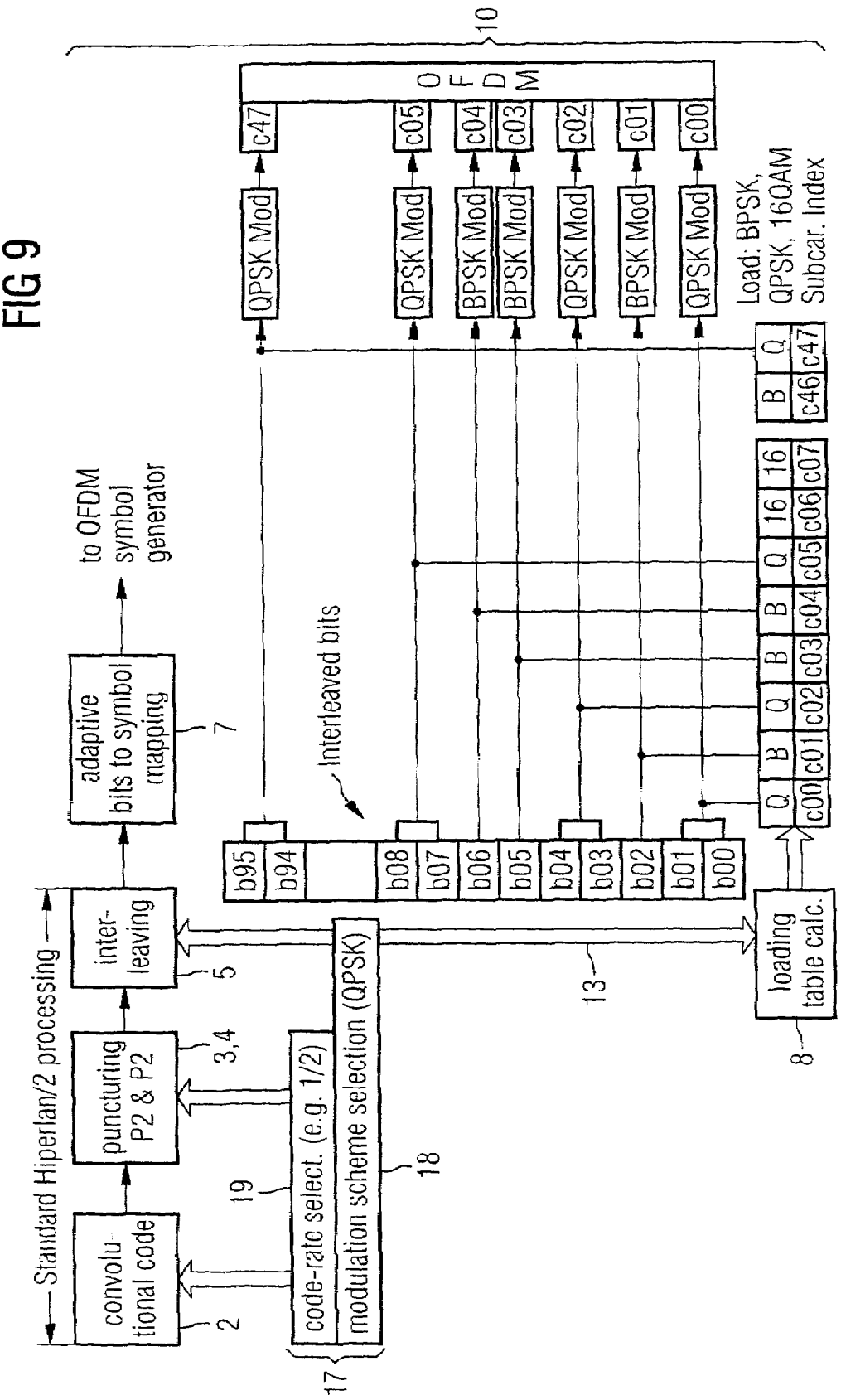
Figure 10:
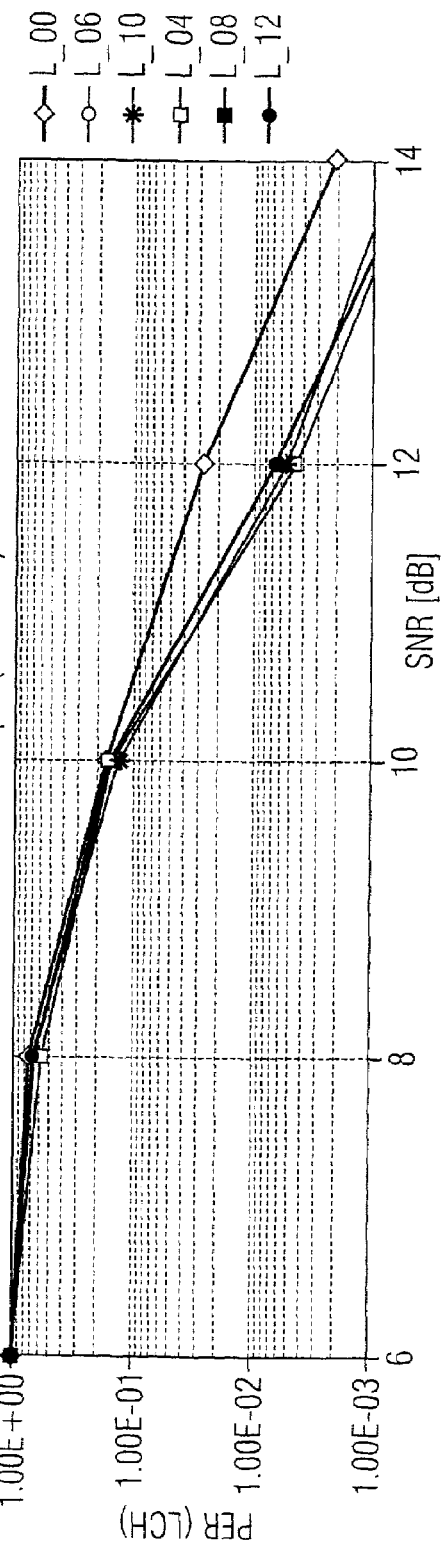
Figure 11:
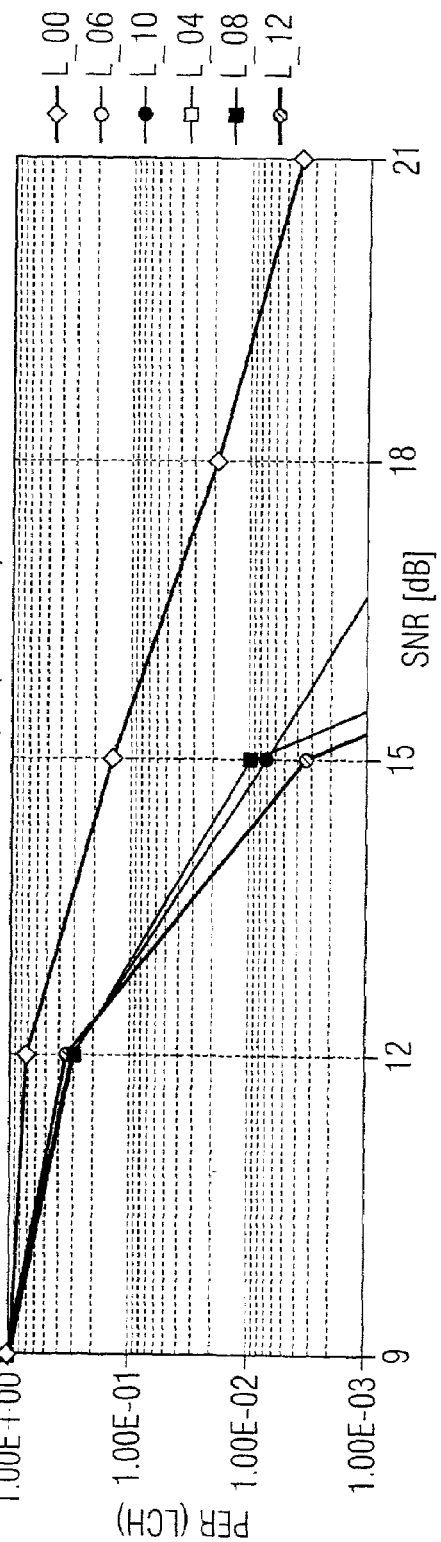
Figure 12:
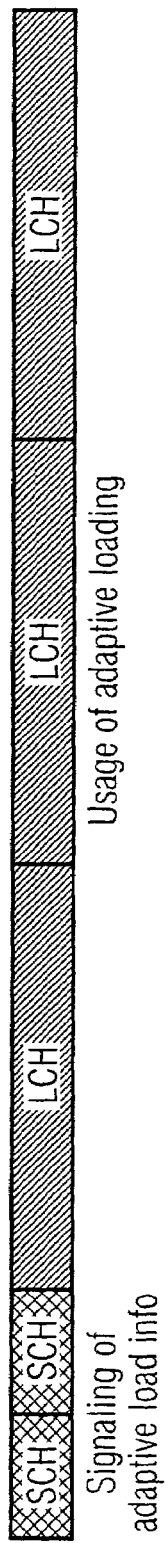
Figure 13:
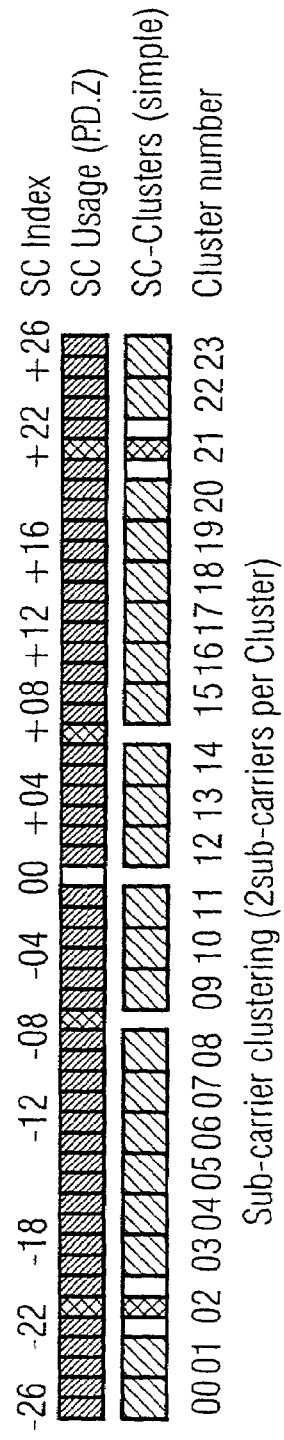
Figure 16:
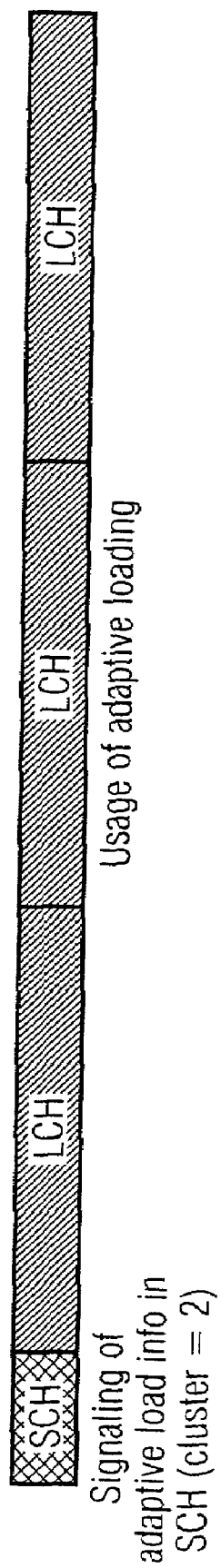

FIG. 4 shows an adaptive subcarrier loading according to the present invention, FIGS. 5 to 8 show simulation results, FIG. 9 shows a detailed view of the adaptive loading technique, FIGS. 10 and 11 show simulation results, FIG. 12 shows the signalling overhead according to the present invention, FIG. 13 shows the principle of subcarrier clustering, FIGS. 14 and 15 show simulation results, and FIG. 16 shows the overhead required using clustering.

In typical scenarios the channel transfer function can be considered constant for a certain time, this is especially true for indoor, home or office scenarios. In this case the transmitter and receiver station are stationary (or quasi stationary) which means the channel is not changing as it would be in a out-door, high user mobility wireless communication system. If the channel is not changing (or only slowly changing) an optimised loading (modulation scheme on each subcarrier is adapted to the actual channel transfer function on the subcarrier) can offer significant gains.

In mobile radio channels it is common practice to apply the 'rule of the thumb' to calculate the coherence time. However, such approach may often lead to unpredictable inaccuracies in high speed environments. Therefore, it is expedient to estimate the coherence time $T_c$ by the following formula:

$$T_c \geq \frac{1}{2\pi \cdot f_D} \cdot \arccos(c)|, \qquad (1)$$

where c is the coherence level considered and $f_D$ is the Doppler shift. For reliable channel estimation a coherence level of >0.9 should be achieved.

Channel Coherence Time Examples
Carrier frequency: 5 GHz

| Carrier Freq [GHz] 5 | | | Coherence Level 0.9 |
| --- | --- | --- | --- |
| Speed [km/h] | Speed [m/s] | Doppler | Coherence Time [ms] |
| 0.1 | 0.02777778 | 0.46296296 | 155.052 |
| 0.3 | 0.08333333 | 1.38888889 | 51.6839 |
| 1 | 0.27777778 | 4.62962963 | 15.5052 |
| 3 | 0.83333333 | 13.8888889 | 5.16839 |

For typical low mobility speeds (<3 km/h) the channel coherence time becomes rather long and therefore application of adaptive modulations (which relies on 'constant' channel) becomes applicable.

Reasons are:
Channel needs to be constant for the period of measuring the channel, calculation of suitable loading scheme and application of the adaptive loading scheme Signalling overhead (required when modifications of the loading scheme are performed) are minimised (the used subcarrier loading scheme needs to be exchanged between the transmitter and receiver side.

The invention comprises an adaptive loading calculation scheme and signalling scheme usable for wireless, multicarrier transmission, such as f.e. ETSI BRAN Hiperlan/2 (and similar standards like IEEE802.11a, ARIB MMAC WATM), with minimum changes required in the current standards. The concept of the invention can be applied as an extension to the existing standard with full backward compatibility.

As shown in FIG. 4 only the adaptive bits-to-symbol mapping block 7 on the transmitter side 10 is affected (and the corresponding block 11 on the receiver side 12), all other blocks both on the transmitter side 10 and the receiver side 11 remain the same. The interleaver 5 is configured according to the RLC selected format, e.g. for 'QAM16' the QAM16 IL scheme defined in the HL2 PHY specification is used. The Adaptive Loading Calculation block 8 calculates loading tables 13, one entry for each data subcarrier, and supplies it to the adaptive bits-to-symbol mapping block 7. The calculation by the The Adaptive Loading Calculation block 8 is performed on the basis of the fading channel profile information 9 supplied to the adaptive loading calculation block 8. This fading channel profile information 9 is e.g. measured at the receiver side 11 and exchanged between the receiver and the transmitter.

Adaptive Loading Table Calculation Scheme

The fading channel profile information 9 is used to detect the current fading condition on each sub-carrier (power). Then the sub-carriers are sorted (highest power to smallest power) f.e. by the Adaptive Loading Calculation block 8. The carriers with high power levels will then use a higher modulation scheme as the originally selected one, whereas at the same time the small power sub-carriers will use a lower modulation scheme. The total number of used sub-carriers should not be changed (48 data sub-carrier), the total number of coded bits per OFDM symbol will also be maintained. This scheme is named "load swapping".

Examples:
1. If the basic selected modulation scheme is QPSK, the load swapping algorithm implemented in the Adaptive Loading Calculation block 8 will use either BPSK, QPSK and QAM16 for the individual sub-carriers.
2. If the basic selected modulation scheme is QAM16, the load swapping algorithm implemented in the Adaptive Loading Calculation block 8 will use either QPSK, QAM16 and QAM64 for the individual sub-carriers.

Exceptions:
1. If the basic selected modulation scheme is BPSK, the load swapping algorithm implemented in the Adaptive Loading Calculation block 8 will use either NIL, QPSK and QAM16 for the individual sub-carriers. NIL means no modulation at all (empty sub-carrier), in order to keep the power constant the active (modulated) sub-carriers are therefore transmitted with a higher power. The overall (average) sub-carrier power therefore remains unchanged.

Adaptive Loading Tables 13 (BPSK Modulation)

With the constraint mentioned (same number of coded bits per OFDM symbol, total number of used data sub-carriers stays 48), the following loading tables 13 are possible.

TABLE 3

| BPSK loading table (configuration options) | | |
| --- | --- | --- |
| NIL | BPSK | QPSK |
| 0 | 48 | 0 |
| 1 | 46 | 1 |
| 2 | 44 | 2 |
| 3 | 42 | 3 |
| 4 | 40 | 4 |
| 5 | 38 | 5 |
| 6 | 36 | 6 |
| 7 | 34 | 7 |
| 8 | 32 | 8 |
| 9 | 30 | 9 |
| 10 | 28 | 10 |
| 11 | 26 | 11 |
| 12 | 24 | 12 |
| 13 | 22 | 13 |
| 14 | 20 | 14 |
| 15 | 18 | 15 |
| 16 | 16 | 16 |
| 17 | 14 | 17 |
| 18 | 12 | 18 |
| 19 | 10 | 19 |
| 20 | 8 | 20 |

TABLE 3-continued

| BPSK loading table (configuration options) | | |
| --- | --- | --- |
| NIL | BPSK | QPSK |
| 21 | 6 | 21 |
| 22 | 4 | 22 |
| 23 | 2 | 23 |
| 24 | 0 | 24 |

The first configuration (NIL:0, BPSK:48, QPSK:0) is the non-adaptive, standard modulation used for BPSK. All mentioned combinations result in the same number of allocated bits per OFDM symbol, which is 48 in the BPSK case (48 data subcarriers used, each subcarrier carries 1 bit in BPSK case).

Usage Example:
1. The base transport scheme BPSK 3/4 is selected, this means the puncturing P1, P2 3, 4 are used as specified for the code-rate 3/4 case, the interleaver 5 specified for BPSK is used.
2. The combination: NIL:8, BPSK:32, QPSK 8 is selected by the Adaptive Loading Calculation block 8.
3. The eight strongest sub-carriers now carry QPSK constellations, the eight weakest are not modulated, as now only 40 sub-carriers are used in total the power of the used sub-carrier is increased by a factor of (48/40).

Adaptive Loading (BPSK Modulation) Performance:

The two modes specified in Hiperlan/2 are investigated: BPSK1/2 and BPSK3/4. The goal is to find a suitable combination of:

NIL: X BPSK: Y QPSK: Z

Which should then be fixed and used for adaptive modulation.

We therefore vary the possible combinations, e.g.:

| Name | NIL [used sub-carrier] | BPSK [used sub-carrier] | QPSK [used sub-carrier] |
| --- | --- | --- | --- |
| L__00 (no AL) | 0 | 48 | 0 |
| L__08 | 8 | 32 | 8 |
| L__12 | 12 | 24 | 12 |
| L__16 | 16 | 16 | 16 |
| L__20 | 20 | 8 | 20 |
| L__24 | 24 | 0 | 24 |

Figure 5:
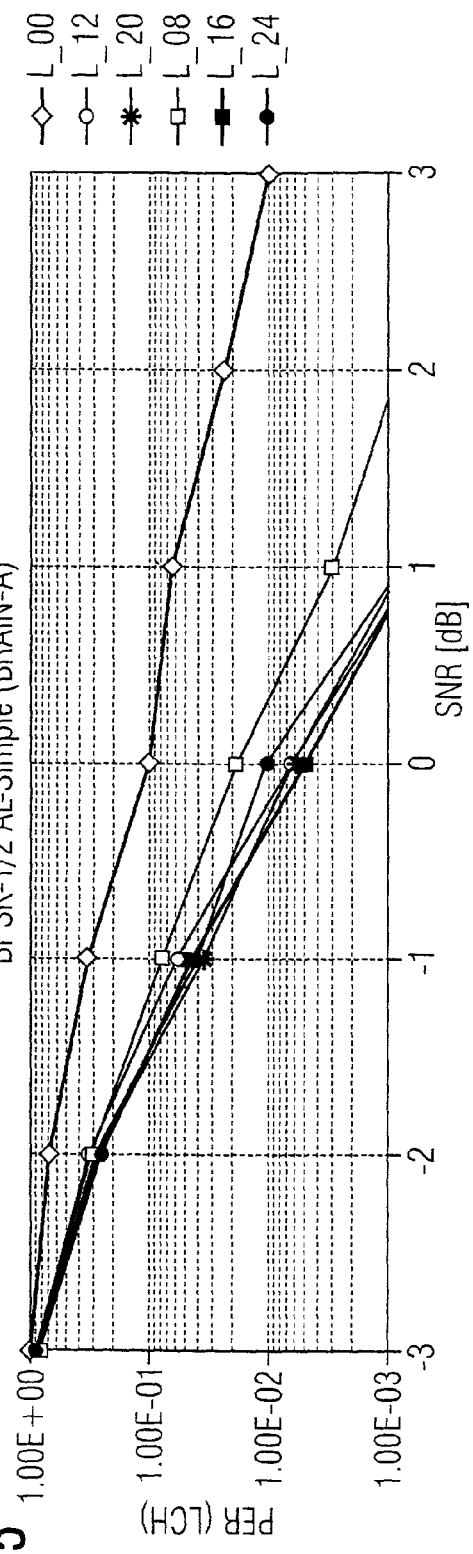
Figure 6:
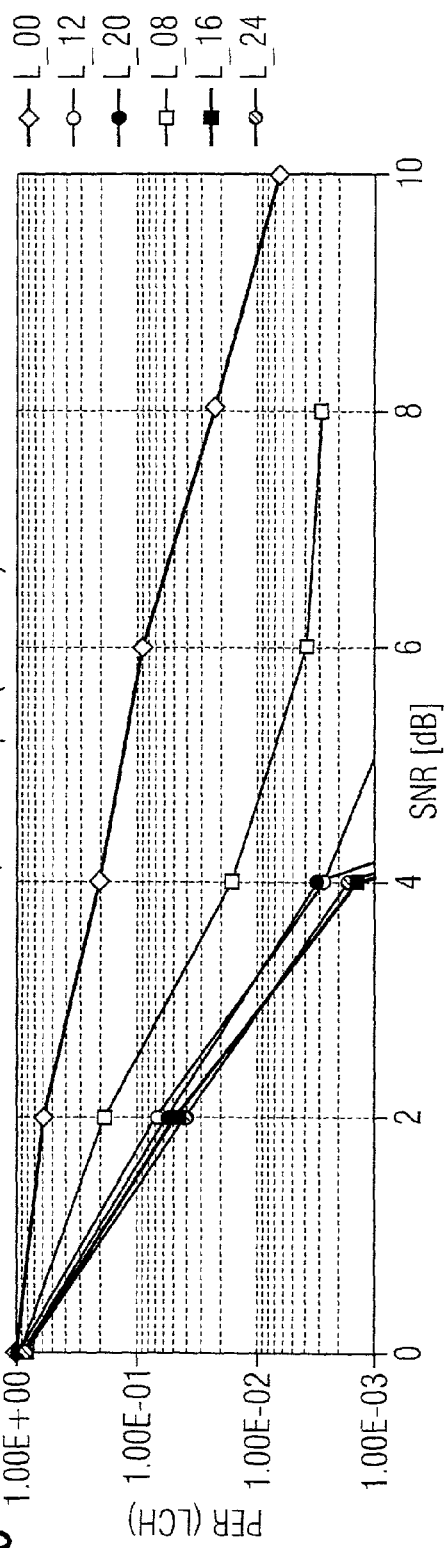

The simulations as depicte in FIGS. 5 and 5 show that many combinations for adaptive loading improve the performance, gains of 3 dB to 6 dB are possible in a typical operation region (packet-error-rate, PER, is 0.01).

Preferred Implementations:
As can be seen the combination NIL: 16, BPSK: 16, QPSK: 16 gives a good compromise and performance in typical channel situations and is therefore suggested to be used when applying adaptive modulation with the basic transmission scheme 'BPSK' being selected.

Another favourable selection would be NIL: 24, BPSK: 0, QPSK: 24, although there is some small degradation compared to the previous selection the usage is simpler (power normalisation).

Adaptive Loading Tables 13 (OPSK Modulation)

With the constraint mentioned (same number of coded bits per OFDM symbol, total number of used data sub-carriers stays 48), the following loading tables 13 are possible.

TABLE 4

QPSK loading table (configuration options)

| BPSK | QPSK | QAM16 |
|---|---|---|
| 0 | 48 | 0 |
| 2 | 45 | 1 |
| 4 | 42 | 2 |
| 6 | 39 | 3 |
| 8 | 36 | 4 |
| 10 | 33 | 5 |
| 12 | 30 | 6 |
| 14 | 27 | 7 |
| 16 | 24 | 8 |
| 18 | 21 | 9 |
| 20 | 18 | 10 |
| 22 | 15 | 11 |
| 24 | 12 | 12 |
| 26 | 9 | 13 |
| 28 | 6 | 14 |
| 30 | 3 | 15 |
| 32 | 0 | 16 |

The first configuration (BPSK:0, QPSK:48, QAM16:0) is the non-adaptive, standard modulation used for QPSK. All mentioned combinations result in the same number of allocated bits per OFDM symbol, which is 96 in the QPSK case (48 data subcarriers used, each subcarrier carries 2 bit in QPSK case).

Usage example:
1. The base transport scheme QPSK 3/4 is selected, this means the puncturing P1, P2 3,4 are used as specified for the code-rate 3/4case, the interleaver 5 specified for QPSK is used.
2. The combination: BPSK:16, QPSK:24, 16QAM 8 is selected by the Adaptive Loading Calculation block 8.
3. The eight strongest sub-carriers now carry QAM16 constellations, the sixteen weakest are modulated with BPSK, 24 sub-carriers are QPSK modulated.

Adaptive Loading—1 (QPSK Modulation) Performance

The two modes specified in Hiperlan/2 are investigated: QPSK1/2 and QPSK3/4. The goal is to find a suitable combination of:

BPSK: X QPSK: Y QAM16: Z

Which should then be fixed and used for adaptive modulation.

We therefore vary the possible combinations, e.g.:

| Name | BPSK [used sub-carrier] | QPSK [used sub-carrier] | QAM16 [used sub-carrier] |
|---|---|---|---|
| L__00 (no AL) | 0 | 48 | 0 |
| L__04 | 8 | 36 | 4 |
| L__06 | 12 | 30 | 6 |
| L__08 | 16 | 24 | 8 |
| L__10 | 20 | 18 | 10 |
| L__12 | 24 | 12 | 12 |

The simulations as depicted in FIGS. 7 and 8 show that many combinations for adaptive loading improve the performance, gains of 2 dB to 4 dB are possible in a typical operation region (packet-error-rate, PER, is 0.01).

Preferred Implementations:

As can be seen the combination BPSK: 16, QPSK: 24, QAM16: 8 gives a good compromise and performance in typical channel situations and is therefore suggested to be used when applying adaptive modulation with the basic transmission scheme 'QPSK' being selected.

Another favourable seen the combination BPSK: 20, QPSK: 18, QAM16: 10 which also gives a good performance in typical channel situations.

Explanation:

FIG. 9 shows the simplicity of the scheme (transmitter side 10 depicted, receiver is accordingly):

1. The coding 2, puncturing 3, 4, and interleaving 5 is done according to the standard.
2. Then the loading table 13 (calculated as described) is used to collect the number of bits to be modulated onto each subcarrier. Here the basic scheme QPSK is selected the loading table 13 therefore contains entries for collecting 1 bit-BPSK, 2 bit-QPSK, or 4 bit-16QAM for each subcarrier.
3. The collected bits are then fed to the appropriate modulator 7.
4. The modulated symbols are then mapped onto the appropriate subcarrier
5. The modulated subcarriers are then further processed (e.g. IFFT for OFDM processing).

Adaptive Loading Tables (QAM16 Modulation)

With the constraint mentioned (same number of coded bits per OFDM symbol, total number of used data sub-carriers stays 48), the following loading tables 13 are possible.

TABLE 5

QAM16 loading table (configuration options)

| QPSK | QAM16 | QAM64 |
|---|---|---|
| 0 | 48 | 0 |
| 1 | 46 | 1 |
| 2 | 44 | 2 |
| 3 | 42 | 3 |
| 4 | 40 | 4 |
| 5 | 38 | 5 |
| 6 | 36 | 6 |
| 7 | 34 | 7 |
| 8 | 32 | 8 |
| 9 | 30 | 9 |
| 10 | 28 | 10 |
| 11 | 26 | 11 |
| 12 | 24 | 12 |
| 13 | 22 | 13 |
| 14 | 20 | 14 |
| 15 | 18 | 15 |
| 16 | 16 | 16 |
| 17 | 14 | 17 |
| 18 | 12 | 18 |
| 19 | 10 | 19 |
| 20 | 8 | 20 |
| 21 | 6 | 21 |
| 22 | 4 | 22 |
| 23 | 2 | 23 |
| 24 | 0 | 24 |

The first configuration (QPSK:0, QAM16:48, QAM64:0) is the non-adaptive, standard modulation used for QPSK. All mentioned combinations result in the same number of allocated bits per OFDM symbol, which is 192 in the QAM16 case (48 used subcarrier, each subcarrier takes 4bit in the 16QAM case).

Usage example:
4. The base transport scheme 16QAM 9/16 is selected, this means the puncturing P1, P2 are used as specified for the code-rate 3/4 case, the interleaver specified for QAM16 is used.

5. The combination: QPSK:12, 16QAM:24, 64QAM 12 is selected.
6. The 12 strongest sub-carriers now carry 64QAM constellations, the 12 weakest are modulated with QPSK, 24 sub-carriers are QAM16 modulated.

Adaptive Loading—1 (QAM16) Performance

The two modes specified in Hiperlan/2 are investigated: 16QAM9/16 and 16QAM3/4. The goal is to find a suitable combination of:

QPSK: X 16QAM: Y 64QAM: Z

Which should then be fixed and used for adaptive modulation.

We therefore vary the possible combinations, e.g.:

| Name | QPSK [used sub-carrier] | QAM16 [used sub-carrier] | QAM64 [used sub-carrier] |
|---|---|---|---|
| L_00 (no AL) | 0 | 48 | 0 |
| L_04 | 4 | 40 | 4 |
| L_06 | 6 | 36 | 6 |
| L_08 | 8 | 32 | 8 |
| L_10 | 10 | 28 | 10 |
| L_12 | 12 | 24 | 12 |

For 16QAM coderate 1/2 and 16QAM coderate 3/4 selected as basic transmission scheme gains between 1 dB (coderate 9/16 case) and 4.5 dB (coderate 3/4 case) are possible.

Preferred Implementations:
As can be seen from the simulations shown in FIGS. 10 and 11 the combination QPSK: 12, QAM16: 24, QAM64: 12 gives a good compromise and performance in typical channel situations and is therefore suggested to be used when applying adaptive modulation with the basic transmission scheme '16QAM' being selected.

Signaling (Exchange of Loading Information)

The adaptive loading information needs to be calculated and exchanged between the transmitter and receiver side. Several solutions are possible:

Calculation on Receiver Side Using Duality of the TDD Channel

As Hiperlan/2 uses a TDD (time division duplex) multiple access scheme the channel transfer function is the same for both transmission directions. The receiver (e.g. Mobile Terminal=MT) calculates a suitable loading based on the received signals (either based on user signals or BroadCast channel=BCH), signals the loading information in a signalling field (e.g. in the SCH, using standard non-adaptive loading) and uses the adaptive loading only in the data part (e.g. LCH) of the PDU (protocol data unit) train. In the AP (access point) to MT (mobile terminal) direction the same scheme is possible, where the AP calculates suitable loading tables based on user signals received from the MT (e.g. RCH=random access channel) or based on special, requested channel sounding dummy information requested from the MT (e.g. requested in regular time intervals).

Exchange of Loading Suggestions

If duality of the channel should not be exploited the receiver side may also calculate a suitable loading table based on received signals, suggest this to the transmitter side where the (updated) loading table would then be applied for the data transfer. Also in this case the actual channel transfer function needs to be calculated in regular time intervals to update the used loading tables. This may require usage of special, regular channel sounding signals (or dummy signals or e.g. RCH usage).

Distributed calculation

If the calculation should be avoided on one side (as this includes calculation overhead like sub-carrier power calculation, sorting, . . . ) the receiver side may just compare the sub-carrier powers to different threshold and signals this to the transmitter side. The signalling can be simple .e.g using 3 threshold values only (gives the sub-carrier strength information: "−", "0", "+", "++").The loading table calculation (including strength sorting) would then be done on the other side, signalled back and used for the communication. This would e.g. avoid calculation overhead (power calculation, sorting) on the MT side.

Signalling Overhead

The signalling overhead as proposed is schematically shown in FIG. 12. For the proposed scheme each sub-carrier can carry 3 different modulation schemes, this requires 2 bits for signalling per sub-carrier. To exchange loading information for all 48 data sub-carriers this needs in total 48*2=96 bits, which can be mapped into 2 SCH (each SCH can carry 52 bit of data) in the Hiperlan/2 system.

Clustering of Sub-carriers to Reduce Signalling Overhead

In narrow-band multiple carrier transmission schemes (such as OFDM) adjacent sub-carriers usually have a correlated fading profile, therefore adjacent sub-carriers can be bundled into groups and one common (adaptive) modulation scheme can be used. In the Hiperlan/2 case we investigate the clustering of 2 adjacent sub-carriers.

Hiperlan/2 Sub-carrier Mapping and Proposed Clustering

In Hiperlan/2 in total 52 sub-carriers are used the carriers used for data transmission are (48 sub-carriers):

−26 £ I £ −22, −20£ I £ −8, −6 £ I £ −1, 1 £ I£ 6, 8 £ I £ 20, 22 £ I £ 26 and the pilot carriers for reference signal transmissions are:

I=−21, −7, 7, 21

The sub-carrier falling at D.C. (0-th sub-carrier, I=0) is not used.

Clustering (Simple):

An clustering of 2 sub-carriers as shown in FIG. 13 is proposed, because of the used sub-carrier mapping in Hiperlan/2 two cluster span over a pilot symbol. In total we have 24 clusters.

Performance with Simple Clustering

The simulations depicted in FIGS. 14 and 15 show that a cluster-size of 2 sub-carriers does not (significantly) degrade the performance for the channel scenarios considered. Example with cluster of 2 adjacent subcarriers:

Performance Comparison, Clustering Versus No Clustering

A loss is expected for clustering, as now not every sub-carrier may now use the best possible modulation scheme. In the results presented '-C11' corresponds to no clustering (cluster size is 1 sub-carrier), '-C12' means clustering of 2 adjacent sub-carriers. As seen in the examples the loss is very low when a clustersize of 2 is used instead of no clustering (clustersize=1).

The expected degradation is verified, however, for the scenarios where adaptive SC loading may be used (no/slow mobility as for stationary, indoor applications) the small degradation due to clustering is acceptable. The benefit is a reduction of the signalling load by a factor of 2.

Signalling Overhead Required Using Clustering:

For the proposed scheme each cluster of 2 sub-carriers can carry 3 different modulation schemes, this requires 2 bits for signalling per cluster. To exchange loading information for all 48 data sub-carriers this needs in total 24*2=48 bits, which can be mapped into one single SCH (each SCH can carry 52 bit of data).

Therefore the use of a cluster size of 2 and a PDU train repectively containing 1 SCH with loading information followed by multiple LCHs where the adaptive loading is applied to is proposed. This proposal is shown in FIG. 16.

Summary of the Advantages:

The invention as explained above therefore provides, among others, for the following advantages:
- Transparency to the MAC scheduler, the number of OFDM symbols required transmitting a certain PDU type (e.g. LCH) at a desired transmission format (e.g. QPSK3/4) is maintained.
- Transparent to the standard RLC (radio link control), the RLC still request e.g. BPSK1/2, QPSK3/4 as base transmission scheme, adaptive subcarrier loading is applied only in the PHY (physical layer)
- Modulation schemes used are the same specified in Hiperlan/2 (BPSK, QPSK, 16QAM, 64QAM).
- Interleaver is maintained.
- Supports all coderates specified in Hiperlan/2 (e.g. 1/2, 3/4, 9/16, 3/4).
- Convolution encoder/decoder is maintained.
- Signalling (exchange of loading information) is minimised.

The invention claimed is:

1. A wireless multicarrier transmission method, wherein a multicarrier transmission uses n modulated frequency subcarriers (n is an integer number), a fading condition of each subcarrier is detected to generate fading channel profile information; the modulation of each subcarrier is determined by the following steps:
   - precalculating a plurality of combinations x, y, and z defining x subcarriers for modulation with a lower modulation scheme, y subcarriers for modulation with a standard modulation scheme, and z subcarriers for modulation with a higher modulation scheme (x, y, and z are integer numbers) such that a resulting number of coded bits of a multicarrier symbol is constant; wherein the sum of x, y, and z is n;
   - selecting one of the combinations for said multicarrier transmission in order to fix the integer numbers x, y, and z during said multicarrier transmission; and
   - modulating the x subcarriers having low fading channel profile information with the lower modulation scheme, modulating the y subcarriers having medium fading channel profile information with the standard modulation scheme, and modulating the z subcarriers having high fading channel profile information with the higher modulation scheme.

2. The method according to claim 1, wherein a transmission power of the subcarriers is adapted such that a total transmission power for all n subcarriers is unchanged.

3. The method according to claim 2, wherein the transmission power of subcarriers modulated with the higher modulation scheme is enhanced to compensate for subcarriers which are not modulated.

4. The method according to claim 1, wherein adaptive loading information reflecting an adaptation of the modulation scheme of the subcarriers is exchanged between a transmitter and a receiver of the multicarrier transmission.

5. The method according to claim 4, wherein the receiver calculates an adaptive loading based on received signals, sends the adaptive loading information in a signaling field to the transmitter; and uses the calculated adaptive loading in a data field of a transmitter data train.

6. The method according to claim 1, wherein a plurality of subcarriers is bundled into groups and the same modulation scheme is applied to all subcarriers belonging to the same group.

7. The method according to claim 6, wherein a plurality of adjacent subcarriers is bundled into one group.

8. A computer-readable medium for storing therein a computer software program running on a wireless transmitting device for executing a wireless multicarrier transmission that uses n modulated frequency subcarriers (n is an integer number); a fading condition of each subcarrier is detected to generate fading channel profile information; the program determines the modulation of each subcarrier by performing the following steps:
   - precalculating a plurality of combinations x, y, and z defining x subcarriers for modulation with a lower modulation scheme, y subcarriers for modulation with a standard modulation scheme, and z subcarriers for modulation with a higher modulation scheme (x, y, and z are integer numbers) such that a resulting number of coded bits of a multicarrier symbol is constant; wherein the sum of x, y, and z is n;
   - selecting one of the combinations for said multicarrier transmission in order to fix the integer numbers x, y, and z during said multicarrier transmission; and
   - modulating the x subcarriers having low fading channel profile information with the lower modulation scheme, modulating the y subcarriers having medium fading channel profile information with the standard modulation scheme, and modulating the z subcarriers having high fading channel profile information with the higher modulation scheme.

9. A wireless multicarrier transmission device for a multicarrier transmission uses n modulated frequency subcarriers (n is an integer number), comprising:
   - a fading channel profile unit for detecting a fading condition of each subcarrier;
   - a unit for precalculating a plurality of combinations x, y, and z defining x subcarriers for modulation with a lower modulation scheme, y subcarriers for modulation with a standard modulation scheme, and z subcarriers for modulation with a higher modulation scheme (x, y, and z are integer numbers) such that a resulting number of coded bits of a multicarrier symbol is constant; wherein the sum of x, y, and z is n;
   - selecting means for selecting one of the combinations for said multicarrier transmission in order to fix the integer numbers x, y, and z during the multicarrier transmission; and
   - an adaptive bits-to-symbol mapping unit for modulating the x subcarriers having low fading channel profile information with the lower modulation scheme, modulating the y subcarriers having medium fading channel profile information with the standard modulation scheme, and modulating the z subcarriers having high fading channel profile information with the higher modulation scheme.

10. The device according to claim 9, wherein the unit for precalculating bundles respectively a plurality of subcarriers into groups and applies the same modulation scheme to all subcarriers belonging to the same group.

11. The device according to claim 10, wherein the unit for precalculating bundles a plurality of adjacent subcarriers into one group.

* * * * *